US011198360B2

(12) United States Patent
Lee et al.

(10) Patent No.: US 11,198,360 B2
(45) Date of Patent: Dec. 14, 2021

(54) AUTOMATIC OPENING AND CLOSING DEVICE FOR FUEL INLET OF VEHICLE

(71) Applicants: Hyundai Motor Company, Seoul (KR); Kia Motors Corporation, Seoul (KR); Korea Fuel-Tech Corporation, Anseong-si (KR)

(72) Inventors: Tae Yoon Lee, Seoul (KR); June Young Park, Hwaseong-si (KR); Seung Hoon Choi, Seoul (KR); Sung Won Lee, Hwaseong-si (KR); Tae Suk Lee, Hwaseong-si (KR); Jun Sik Lim, Bucheon-si (KR); Ki Hong Kim, Anseong-si (KR); Dong Chul Lee, Hwaseong-si (KR)

(73) Assignees: Hyundai Motor Company, Seoul (KR); Kia Motors Corporation, Seoul (KR); Korea Fuel-Tech Corporation, Anseong-si (KR)

( * ) Notice: Subject to any disclaimer, the term of this patent is extended or adjusted under 35 U.S.C. 154(b) by 98 days.

(21) Appl. No.: 16/694,571

(22) Filed: Nov. 25, 2019

(65) Prior Publication Data

US 2020/0298697 A1 Sep. 24, 2020

(30) Foreign Application Priority Data

Mar. 18, 2019 (KR) ........................ 10-2019-0030259

(51) Int. Cl.
*B60K 15/04* (2006.01)
*B60K 15/05* (2006.01)

(52) U.S. Cl.
CPC .......... *B60K 15/0406* (2013.01); *B60K 15/05* (2013.01); *B60K 2015/0419* (2013.01); *B60K 2015/0445* (2013.01)

(58) Field of Classification Search
CPC ............ B60K 15/04; B60K 2015/0422; B60K 2015/0419; B60K 2015/0432; B60K 2015/0445; B60K 2015/0435; B60K 15/05
See application file for complete search history.

(56) References Cited

U.S. PATENT DOCUMENTS 5,485,871 A * 1/1996 Romanek ............... B60K 15/04
                                              141/312
6,880,594 B1 4/2005 Benjey
(Continued)

FOREIGN PATENT DOCUMENTS

KR 20-1998-0015615 U 6/1998
KR 10-2005-0082705 A 8/2005
(Continued)

*Primary Examiner* — Timothy P. Kelly
(74) *Attorney, Agent, or Firm* — Morgan, Lewis & Bockius LLP (57) ABSTRACT

An automatic opening and closing device for a fuel inlet of a vehicle may include a cap cover mounted at the fuel inlet of the vehicle, a fuel cap pivotably mounted at the cap cover and configured to selectively open or close the fuel inlet by being pivoted inside the fuel inlet, and a fuel cap operating mechanism mounted in the fuel inlet and configured, when the fuel door is closed, to pivot the fuel cap by being pressed by the fuel door to close the fuel inlet, and, when the fuel door is opened, pivot the fuel cap to open the fuel inlet according to release of pressing by the fuel door.

7 Claims, 11 Drawing Sheets

(56) References Cited

U.S. PATENT DOCUMENTS 6,983,773 B1 * 1/2006 Hagano .................. B60K 15/04
　　　　　　　　　　　　　　　　　　　　　141/348
2007/0125444 A1 * 6/2007 Hagano .................. B60K 15/05
　　　　　　　　　　　　　　　　　　　　　141/350

FOREIGN PATENT DOCUMENTS

| KR | 10-0513884 B1 | 9/2005 |
| KR | 10-0521537 B1 | 10/2005 |

* cited by examiner

AUTOMATIC OPENING AND CLOSING DEVICE FOR FUEL INLET OF VEHICLE

CROSS-REFERENCE TO RELATED APPLICATION

The present application claims priority to Korean Patent Application No. 10-2019-0030259 filed on Mar. 18, 2019, the entire contents of which is incorporated herein for all purposes by this reference.

BACKGROUND OF THE INVENTION

Field of the Invention

The present invention relates to an automatic opening and closing device for a fuel inlet of a vehicle. More particularly, it relates to an automatic opening and closing device for a fuel inlet of a vehicle, which is capable of enhancing user convenience by easily opening or closing a fuel inlet while refueling.

Description of Related Art

Generally, a fuel tank for storing fuel which is required for driving an engine is mounted in a vehicle, and a filler neck assembly for refueling is connected to the fuel tank.

The filler neck assembly may include a fill line and a fuel inlet. The fill line is connected to the fuel tank, and the fuel inlet is provided on an end portion of the fill line so that a refueling gun is inserted into the fuel inlet to inject fuel.

A fuel cap for sealing is mounted on the fuel inlet, and a fuel door is mounted in a vehicle body to cover the fuel cap. The fuel door is configured to be pivotably about a coupler coupled to the vehicle body.

The fuel door is mounted to open or close a refueling space provided on a side surface of the vehicle. To inject fuel, the fuel door is pivoted to open the refueling space, the fuel cap is pivoted to open the fuel inlet, and then the refueling gun is inserted into the opened fuel inlet.

In the instant case, after the fuel door is opened, the fuel cap is pivoted to be completely separated from the fuel inlet, and then the refueling gun is inserted into the fuel inlet from which the fuel cap is separated so that fuel is injected.

Meanwhile, in recent years, as the number of self-service gas stations at which a driver refuels directly increases, a case in which the driver opens a fuel cap, inserts a refueling gun into a fuel inlet, and directly injects fuel is increasing.

Therefore, it is required to enhance driver convenience when the driver injects the fuel.

Conventionally, while refueling, a driver may rotate the fuel cap coupled to the fuel inlet by applying a higher level of a force to the fuel cap to open the fuel inlet so that it is hard and inconvenient for the driver to open or close the fuel cap.

Furthermore, it is time consuming for the driver to selectively open or close the fuel inlet by rotating the fuel cap, and there is a concern in that the fuel cap separated from the fuel inlet is lost.

Furthermore, in recent years, a vehicle that needs an injection of a urea solution with fuel, i.e., to which a selective catalyst reduction (SCR) system is applied is increasing, and since the urea solution may be continuously used in the vehicle to which the SCR system is applied to remove nitrogen oxides during the vehicle is running, the vehicle may be refilled with the urea solution as being refueled.

To this end, in addition to a fuel tank, a urea solution tank for storing a urea solution and a separate filler neck for injecting a urea solution into the urea solution tank are provided in the vehicle to which the SCR system is applied. Generally, in a gas station, the urea solution is injected and filled in the urea solution tank through the filler neck using a refueling gun.

Figure 1:
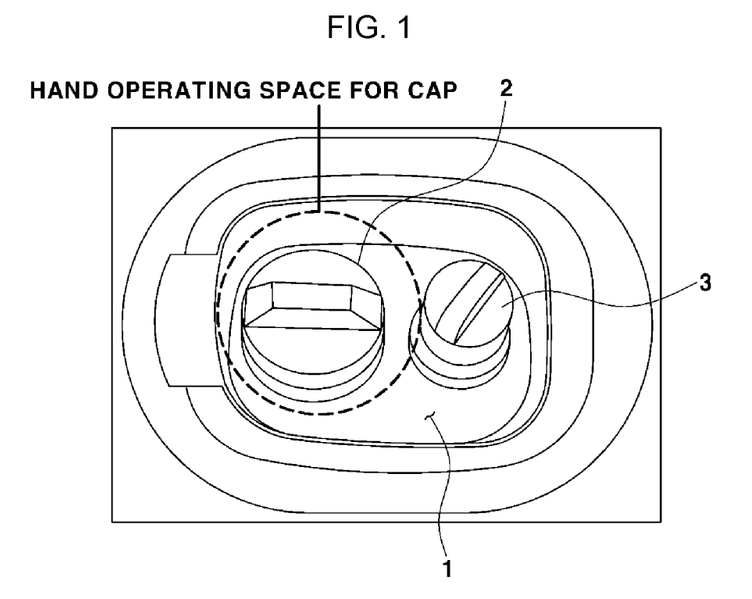
FIG. 1 is a diagram illustrating a state in which a conventional fuel cap and a conventional urea solution cap are mounted.

FIG. 1 is a diagram illustrating a refueling space of a vehicle to which an SCR system. In FIG. 1, a fuel door (which is in an opened state or a removed state) is not illustrated, and a state in which a fuel cap 2 and a urea solution cap 3 are mounted in a refueling space 1 is illustrated.

Here, the refueling space 1 is a space in which a fuel inlet for injecting fuel in the vehicle and a urea solution inlet for injecting a urea solution are exposed to the outside. The fuel door is mounted to cover or expose the refueling space 1.

As shown in the drawing, in the refueling space 1, the fuel cap 2 is mounted at a fuel inlet (having no reference numeral), and the urea solution cap 3 is mounted at the urea solution inlet (having no reference numeral).

As described above, in addition to the fuel inlet and the fuel cap 2, the urea solution inlet and the urea solution cap 3 are additionally mounted in the vehicle to which the SCR system is applied. Therefore, as compared with a vehicle that does not use a urea solution, a hand operating space (see a circle in FIG. 1) for opening or closing the fuel cap 2 in the refueling space 1 is inevitably narrow.

To sufficiently secure the hand operating space, a size of the fuel door may be increased along with the refueling space 1. However, when the size of the fuel door is increased, an aesthetic appearance of the vehicle may be degraded.

In recent years, to improve and secure the aesthetic appearance of the vehicle, there is a tendency to reduce the size of the fuel door. In the instant case, the hand operating space for opening or closing the fuel cap 2 is inevitably narrow so that measures are urgent to enhance user convenience.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an opening and closing device configured for a fuel inlet of a vehicle, which is configured for easily open or close a fuel inlet while refueling to enhance user convenience.

Various aspects of the present invention are directed to providing an opening and closing device configured for a fuel inlet of a vehicle without causing the loss of a fuel cap.

Various aspects of the present invention provide an automatic opening and closing device configured for a fuel inlet of a vehicle, which may include a cap cover mounted at the fuel inlet of the vehicle, a fuel cap pivotably mounted at the cap cover and configured to selectively open or close the fuel inlet by being pivoted inside the fuel inlet, and a fuel cap operating mechanism mounted in the fuel inlet and configured, when the fuel door is closed, to pivot the fuel cap by being pressed by the fuel door to close the fuel inlet, and, when the fuel door is opened, pivot the fuel cap to open the fuel inlet according to release of pressing by the fuel door.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

It may be understood that the appended drawings are not necessarily to scale, presenting a somewhat simplified representation of various exemplary features illustrative of the basic principles of the disclosure. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be fully described in a detail which is suitable for implementation by those skilled in the art to which an exemplary embodiment of the present invention pertains with reference to the accompanying drawings. However, the present invention is not limited to the exemplary embodiments included herein and may be implemented in other forms.

Throughout the present disclosure, when a portion is referred to as "including" a component, it refers that the portion can further include other components, not excluding the other components unless specifically stated otherwise.

The present invention is directed to providing an opening and closing device configured for a fuel inlet, which is configured for easily opening or closing a fuel inlet while refueling to enhance user convenience and solving a problem of the loss of a fuel cap.

To the present end, as a device configured for opening or closing a fuel inlet of a filler neck assembly in a vehicle, an automatic opening and closing device configured for a fuel inlet is configured for automatically opening or closing a fuel inlet by being interlocked with opening or closing of a fuel door.

As it is known, in a conventional vehicle, a fuel door is opened for refueling, a fuel cap is removed from a fuel inlet to open the fuel inlet, and then a refueling gun is inserted into the fuel inlet to inject fuel.

In this regard, when the fuel inlet is opened, a method in which the fuel cap is pivoted inwardly of the fuel inlet is applied to the automatic opening and closing device configured for a fuel inlet according to an exemplary embodiment of the present invention instead of a method in which the fuel cap is completely separated or removed from the fuel inlet.

When the fuel door is opened for refueling, the automatic opening and closing device configured for a fuel inlet according to an exemplary embodiment of in various aspects of the present invention, the fuel cap is automatically pivoted inwardly of the fuel inlet to open the fuel inlet.

Figure 2:
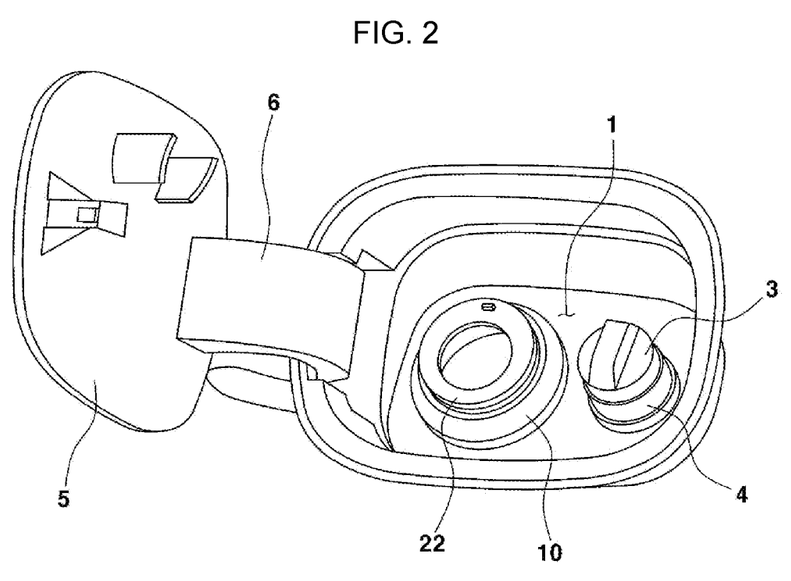
FIG. 2 is a diagram illustrating a state in which a fuel inlet and a urea solution inlet are mounted in a vehicle to which an automatic opening and closing device configured for a fuel inlet according to an exemplary embodiment of the present invention is applied.

FIG. 2 is a diagram illustrating a state in which the fuel inlet and a urea solution inlet are mounted in a vehicle to which the automatic opening and closing device configured for a fuel inlet according to an exemplary embodiment of the present invention is applied. A reference numeral 1 denotes a refueling space which is opened or closed by a fuel door 5, and a reference numeral 20 denotes the automatic opening and closing device configured for a fuel inlet according to an exemplary embodiment of the present invention.

The refueling space 1 is a space which is provided on a side surface of a vehicle body or the like to be coverable by the fuel door 5 and in which an end portion of a fuel inlet 10 is exposed.

A reference numeral 3 denotes a urea solution cap which is mounted to open or close a urea solution inlet 4 in the refueling space 1. In a vehicle to which a selective catalytic reduction (SCR) system is applied, an end portion of the urea solution inlet 4 is located in the refueling space 1, and the urea solution cap 3 is engaged with the urea solution inlet 4.

Therefore, as shown in FIG. 2, the fuel inlet 10 and the urea solution inlet 4 are configured to be spaced at a predetermined interval apart from each other in a side direction on the vehicle body inside the refueling space 1, and the fuel door 5 is mounted to open or close the refueling space 1.

The fuel door 5 is configured to be connected to the vehicle body via a hinge bracket 6 to thereby be pivotable about a coupler with respect to the vehicle body. The fuel door 5 opens refueling space 1 while being pivoted outwardly from a vehicle body surface about the coupler with respect to the vehicle body to thereby expose the fuel inlet 10 and the urea solution inlet 4, or the fuel door 5 closes the refueling space 1 while being pivoted toward the vehicle body surface about the coupler with respect to the vehicle body.

Furthermore, a fuel cap is configured to be rotatably coupled inside the fuel inlet 10.

The fuel cap is pivoted inwardly of the fuel inlet 10 to open the fuel inlet 10. When the fuel cap is pivoted outward the fuel inlet 10, the fuel cap closes and blocks the fuel inlet 10.

FIG. 2 illustrates a state in which the fuel inlet 10 is opened by pivoting the fuel cap inwardly of the fuel inlet 10 when the fuel door 5 is opened.

Figure 3:
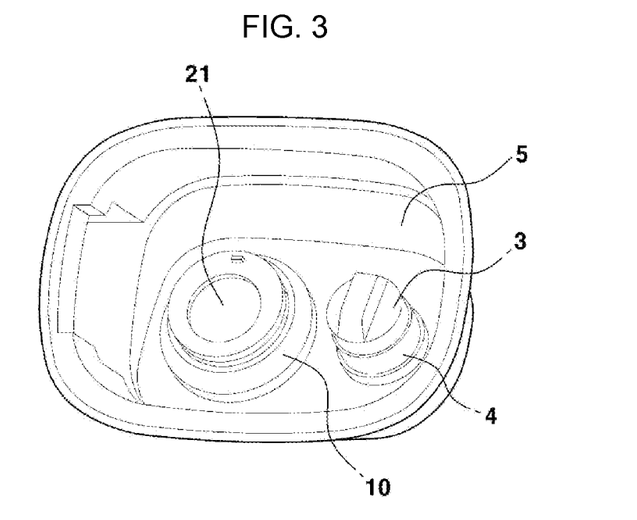
FIG. 3 is a diagram illustrating a state in which, when a fuel door is in a closed state, a fuel cap closes the fuel inlet in the automatic opening and closing device configured for a fuel inlet according to an exemplary embodiment of the present invention.

When the fuel door 5 is closed in the state of FIG. 2, the fuel cap is pivoted in an opposite direction to seal the fuel inlet 10. FIG. 3 illustrates a state in which a fuel cap 21 closes the fuel inlet 10 when the fuel door 5 is in a closed state.

When the fuel door 5 is actually to be in the closed state, it is to be in a state in which the refueling space 1 of FIG. 2 is covered by the fuel door 5 so that not only the refueling space 1 is not exposed in outward appearance but also the fuel cap 21 and the urea solution cap 3, which are located in the refueling space 1, are to be invisible in outward appearance. However, when the fuel door 5 is assumed as being transparent and is to be in the closed state, FIG. 3 illustrates the fuel cap 21 and the urea solution cap 3 in the refueling space 1.

A closed state of the refueling space 1 by the fuel door 5 (i.e., the closed state of the fuel door 5) is a state in which the refueling space 1 is covered by the fuel door 5 to not be exposed to the outside. In the state in which the refueling space 1 is covered by the fuel door 5, the fuel cap 21 and the urea solution cap 3 in the refueling space 1 are actually obscured by the fuel door 5 to not be exposed in outward appearance.

In an exemplary embodiment of the present invention, since an automatic opening and closing operation of the fuel cap 21 is performed by being interlocked with the opening or closing of the fuel door 5, in a state in which the fuel door 5 is opened as shown in FIG. 2, the fuel cap 21 is also automatically opened such that a refueling gun may be inserted to a position at which refueling is available through an internal path of the fuel inlet 10.

Meanwhile, as shown in FIG. 3, in a state in which the fuel door 5 is closed, the fuel inlet 10 is automatically to be in a closed state by the fuel cap 21 in the refueling space 1 covered by the fuel door 5.

Hereinafter, a configuration of the automatic opening and closing device configured for a fuel inlet according to an exemplary embodiment of the present invention will be described in detail with reference to the drawings.

Figure 4:
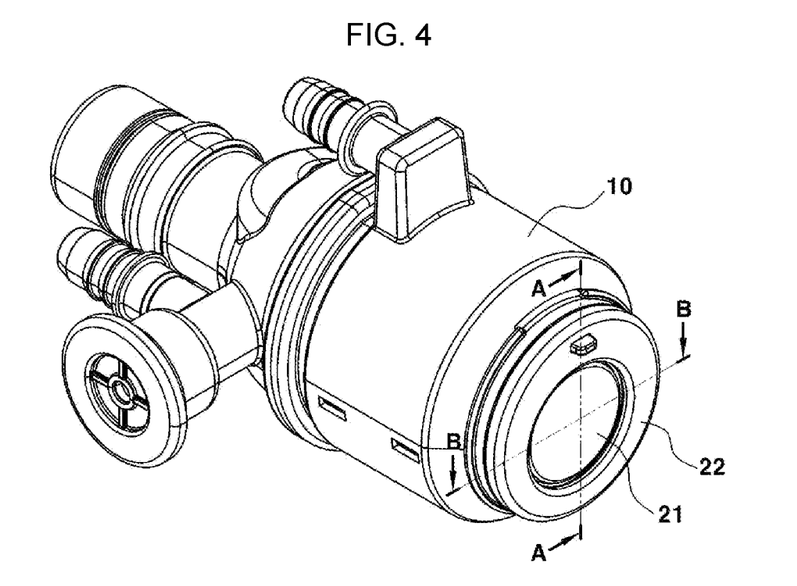
FIG. 4 is a perspective view exemplarily illustrating a fuel inlet in which the automatic opening and closing device configured for a fuel inlet according to an exemplary embodiment of the present invention is mounted.
Figure 5:
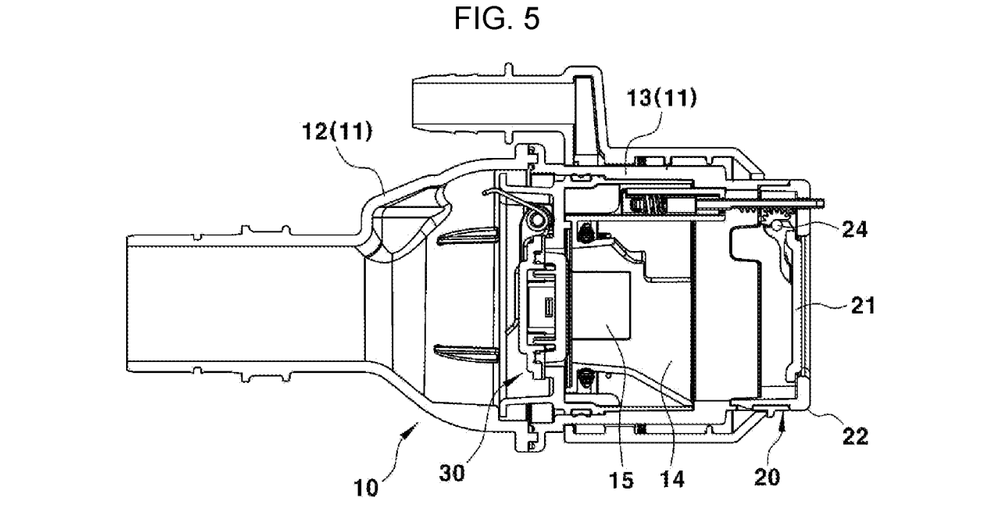
FIG. 5 and FIG. 6 are cross-sectional views illustrating the fuel inlet in which the automatic opening and closing device configured for a fuel inlet according to an exemplary embodiment of the present invention is mounted.
Figure 6:
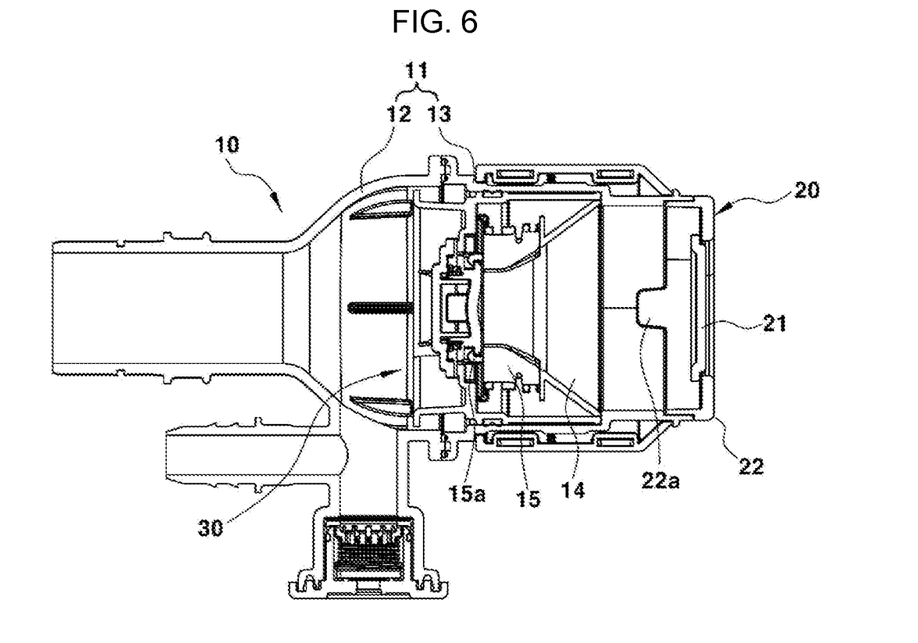

FIG. 4 is a perspective view exemplarily illustrating a fuel inlet in which the automatic opening and closing device configured for a fuel inlet according to an exemplary embodiment of the present invention is mounted, and FIG. 5 and FIG. 6 are cross-sectional views illustrating the fuel inlet in which the automatic opening and closing device configured for a fuel inlet according to an exemplary embodiment of the present invention is mounted.

FIG. 5 is the cross-sectional view taken along line A-A' of FIG. 4, and FIG. 6 is the cross-sectional view taken along line B-B' of FIG. 4.

Figure 7:
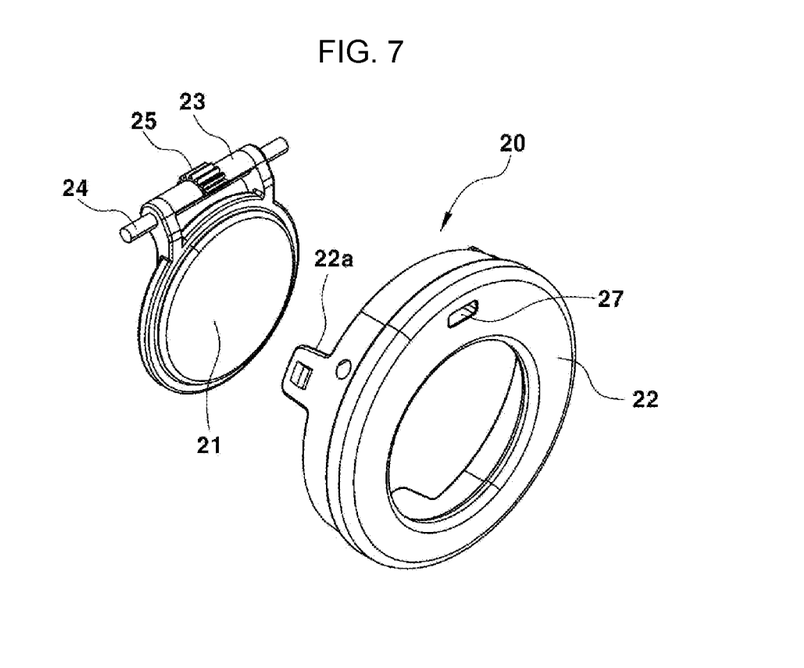
FIG. 7 is an exploded perspective view exemplarily illustrating a main configuration of the automatic opening and closing device configured for a fuel inlet according to an exemplary embodiment of the present invention.
Figure 8:
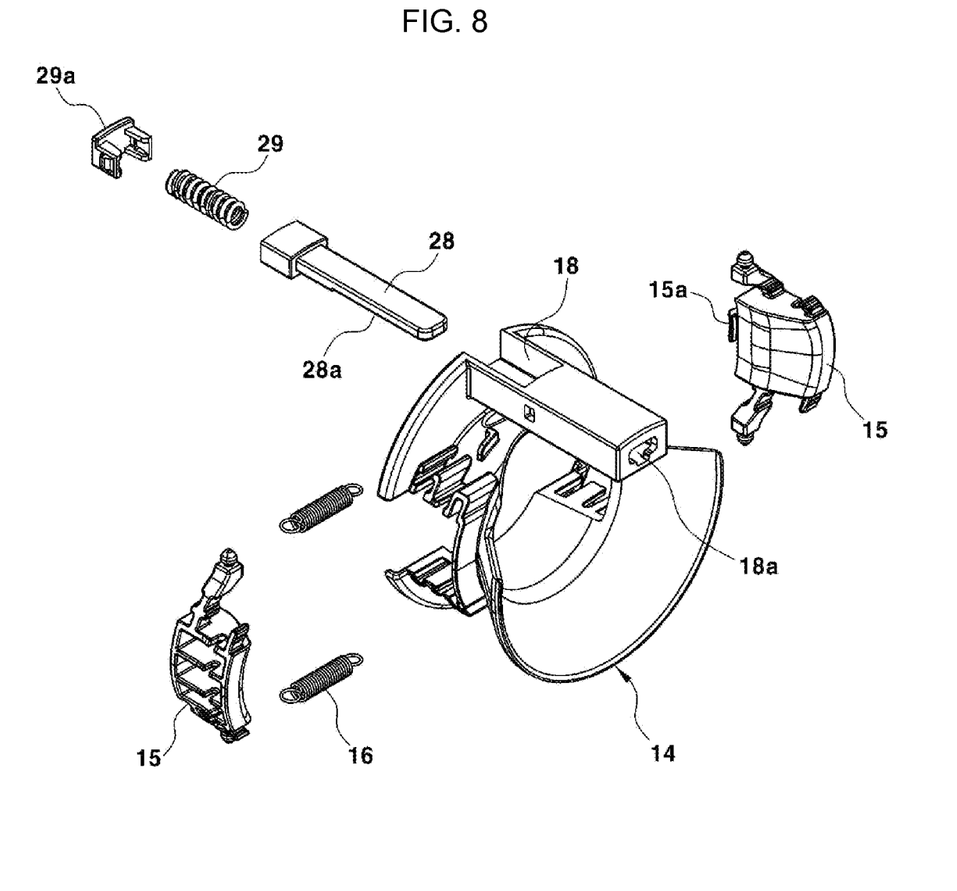
FIG. 8 is an exploded perspective view exemplarily illustrating a retainer and a door button of the fuel inlet in which the automatic opening and closing device configured for a fuel inlet according to an exemplary embodiment of the present invention is mounted.
Figure 9:
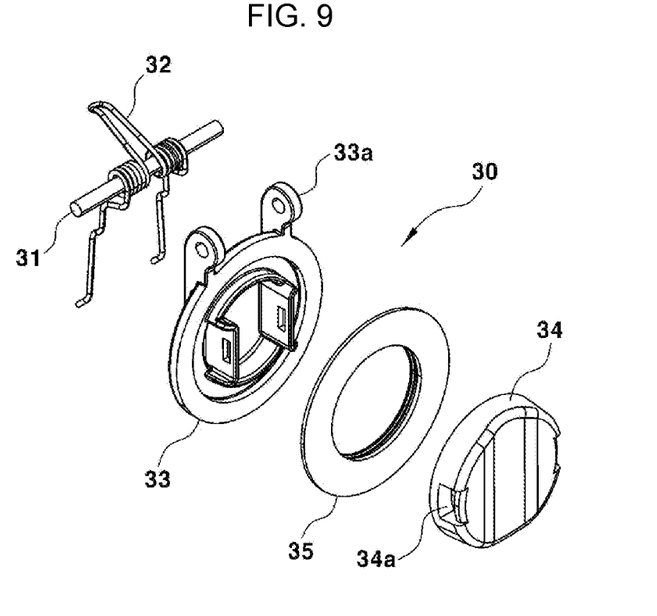
FIG. 9 is an exploded perspective view exemplarily illustrating a flap mechanism of the fuel inlet in which the automatic opening and closing device configured for a fuel inlet according to an exemplary embodiment of the present invention is mounted.

FIG. 7 is an exploded perspective view exemplarily illustrating a main configuration of the automatic opening and closing device configured for a fuel inlet according to an exemplary embodiment of the present invention, FIG. 8 is an exploded perspective view exemplarily illustrating a retainer and a door button which are mounted in the fuel inlet, and FIG. 9 is an exploded perspective view exemplarily illustrating a flap mechanism mounted in the fuel inlet.

First, the fuel inlet 10 is mounted at an end portion of an injection pipe. The fuel inlet 10 has the internal path into which a refueling gun is inserted while refueling and may include a housing 11 including a first housing 12 and a second housing 13.

The first housing 12 is fixed and coupled to the second housing 13 by vibration welding or the like, and a retainer 14 is mounted inside the housing 11 having a configuration in which the first housing 12 is coupled to the second housing 13.

As shown in FIG. 8, rotating stoppers 15 are mounted at both left and right positions of the retainer 14 inside the housing 11. Although not exemplified in detail in the drawings, each of the stoppers 15 is provided to be rotatably coupled to the retainer 14 through hinge pins on both sides of the stopper 15 and provided to be elastically pivoted by a stopper spring 16 which is provided between the retainer 14 and the stopper 15.

All the stoppers 15 on both left and right sides of the retainer 14 are pivoted about the hinge pins in the retainer 14. When each of the stoppers 15 is pivoted outward the retainer 14, the stopper spring 16 may be extended. Contrarily, each of the stoppers 15 may be pivoted inwardly of the retainer 14 by the elastic restoration force of the extending stopper spring 16.

Furthermore, a hook 15a is provided in each of the stoppers 15 to be configured to be hooked to a flapper cover 34 of a flap mechanism 30 which will be described below.

The stopper 15 is mounted to distinguish specifications of refueling guns and prevent mixture of diesel fuel and gasoline fuel. In a conventional diesel vehicle, a fuel mixture prevention device including the fuel inlet 10 with the stopper 15 is provided.

The fuel mixture prevention device is configured to prevent gasoline fuel from being injected into a diesel vehicle and utilizes the fact that a diameter of a diesel refueling gun used to inject diesel fuel is greater than that of a gasoline refueling gun used to inject gasoline fuel.

That is, only when the diesel refueling gun having a large diameter is inserted, the stoppers 15 on both the left and right sides of the retainer 14 are pressed by the diesel refueling gun and, simultaneously, pivoted outward. In the instant case, the hook 15a of the stopper 15 is separated from the flap mechanism 30 and thus the flap mechanism 30 is unlocked.

Thus, the flap mechanism 30 may be pivoted while being pushed inward by the diesel refueling gun inserted into a refueling pipe. In the instant case, the flap mechanism 30 opens the internal path of the housing 11 of the fuel inlet 10 such that the diesel refueling gun may be inserted to a position at which refueling is available.

Meanwhile, when the gasoline refueling gun having a relatively small diameter is inserted, the gasoline refueling gun is not able to press the stoppers 15 outward such that the stoppers 15 is not able to be pivoted. In the instant case, in a state in which the hook 15a of the stopper 15 is continuously hooked to the flap mechanism 30, the flap mechanism 30 is not unlocked such that a state in which the fuel inlet 10 is closed, i.e., the internal path of the housing 11 is blocked, is maintained.

Consequently, the gasoline fueling gun is not able to pass through the internal path of the fuel inlet 10 and not able to be inserted to a refueling position such that incorrect refueling of gasoline fuel may be prevented.

FIG. 9 exemplifies a configuration of the flap mechanism 30. The flap mechanism 30 may include a flapper 33 coupled to an internal surface of the housing 11 by a hinge pin 31 and pivoted about the hinge pin 31 to open or close the internal path of the housing 11 and the internal path of the retainer 14, the flapper cover 34 integrally coupled to a front surface of the flapper 33, a sealing member 35 mounted on the flapper cover 34 and configured to seal between the flapper cover 34 and the internal surface of the housing 11, and a flapper spring 32 mounted between the flapper 33 and the internal surface of the housing 11 in a state of being mounted on the hinge pin 31 and configure to provide an elastic restoration force for rotating the flapper 33 to block the internal path of the housing 11 and the internal path of the retainer 14.

A locking groove 34a which is a portion hooked to the hook 15a of the stopper 15 is formed in the flapper cover 34.

Consequently, as described above, when the diesel refueling gun is inserted into the internal path of the housing 11 and then pushes the stoppers 15 on both of the left and right sides of the retainer 14 to rotate the stoppers 15 outward while passing the internal path of the retainer 14, the hook 15a of each of the stoppers 15 is separated from the locking groove 34a of the flapper cover 34 such that the flapper cover 34 is unlocked.

This is that a locked state of the flap mechanism 30 is released. When the diesel refueling gun comes into contact with the flapper cover 34 to move the flapper cover 34 inward (which is a direction in which the diesel refueling gun is inserted into the housing 11 of the fuel inlet 10 for refueling), the flapper 33 is pivoted inwardly of the housing 11 of the fuel inlet 10 together with the flapper cover 34 and the sealing member 35, and then the diesel refueling gun may be inserted to a position at which refueling is available by passing through the flapper 33.

Furthermore, when the diesel refueling gun is pulled in an opposite direction to be drawn out from the fuel inlet 10, the flapper 33 is pivoted in an opposite direction about the hinge pin 31 by the elastic restoration force of the flapper spring 32 such that the internal path of the housing 11 of the fuel inlet 10 is closed again by the flap mechanism 30 of the flapper 33.

In the instant case, as a force of the diesel refueling gun pressing the stoppers 15 on both the left and right sides of the retainer 14 is removed, the stoppers 15 are pivoted by the elastic restoration force of the stopper spring 16 in a direction opposite to a direction when the diesel refueling gun is inserted, i.e., an inward direction thereof. Consequently, the hook 15a of the stopper 15 is hooked to the locking groove 34a of the flapper cover 34 again so that thereafter, only when the diesel refueling gun is inserted, the fuel inlet 10 is opened and otherwise the flap mechanism 30 is to be in a locked state of maintaining the closed state.

In FIG. 9, a reference numeral 33a denotes a hinge formed at an upper end portion of the flapper 33 and coupled to the hinge pin 31.

Meanwhile, the automatic opening and closing device 20 for a fuel inlet according to an exemplary embodiment of the present invention includes the fuel cap 21, a cap cover 22, and a fuel cap operating mechanism. As shown in the drawings, the automatic opening and closing device 20 for a fuel inlet may be mounted at an end portion of the fuel inlet 10.

FIG. 7 exemplifies a flap type rotary fuel cap 21 and the cap cover 22 at which the flap type rotating fuel cap 21 is mounted in the automatic opening and closing device 20 for a fuel inlet according to an exemplary embodiment of the present invention.

As shown in the drawing, the fuel cap 21 is rotatably mounted at the fuel inlet 10 via the cap cover 22. The cap cover 22 is configured to support the fuel cap 21 to be rotatable in the fuel inlet 10.

The cap cover 22 is a ring-shaped member which is mounted to an end portion of the housing 11 of the fuel inlet 10. The fuel cap 21 is rotatably coupled to the internal surface of the housing 11 via a hinge pin 24.

In the instant case, the hinge pin 24 is coupled to pass through a cylindrical-shaped hinge 23 formed to protrude from the fuel cap 21, and both end portions of the hinge pin 24 are coupled to the cap cover 22. Therefore, in the cap cover 22, the fuel cap 21 is configured to be pivotable inwardly of the fuel inlet 10 about the hinge pin 24 as the rotation center.

The cap cover 22 may have engagement portions 22a formed on both left and right sides thereof. The engagement portions 22a are engaged with the end portion of the housing 11 of the fuel inlet 10 through an engagement structure such as a hook-bump structure, a protrusion-groove structure, or the like such that the cap cover 22 may be fixed to the housing 11 of the fuel inlet 10.

Furthermore, the fuel cap 21, more particularly the hinge 23 of the fuel cap 21, has a gear-shaped portion 25. The gear-shaped portion 25 may be configured such that teeth are formed on the hinge 23 of the fuel cap 21 at predetermined intervals in a circumferential direction so that the hinge 23 of the fuel cap 21 is configured as a kind of gear.

Meanwhile, the fuel cap operating mechanism includes a door button 28 and a button spring 29. The door button 28 is mounted in the fuel inlet 10 to be slidable in a forward-backward direction thereof.

as shown in FIG. 8, the door button 28 is mounted at one side of the retainer 14, e.g., an upper end portion of the retainer 14, to be slidable in the forward-backward direction in the fuel inlet 10. In addition to the door button 28, a button cover 29a is mounted at the retainer 14 to be located behind the door button 28.

The door button 28 is a bar or a bar-shaped member which is formed to extend in a predetermined length and mounted lengthily in the fuel inlet 10 in the forward-backward direction thereof. The door button 28 has a rack gear 28a on one surface thereof, and the rack gear 28a is engaged with the gear-shaped portion 25 formed on the hinge 23 of the fuel cap 21.

The rack gear 28a may be configured such that teeth are formed on one surface of the door button 28, e.g., on a lower surface of the door button 28 to be configured to correspond to the hinge 23 of the fuel cap 21, at predetermined intervals in a longitudinal direction thereof.

Thus, the door button 28 having the rack gear 28a formed thereon is configured as a kind of rack. In the instant case, the hinge 23 of the fuel cap 21 on which the gear-shaped portion 25 is formed is configured as a kind of pinion gear.

That is, when the door button 28 slides in the retainer 14 in the forward-backward direction thereof, a linear movement force of the door button 28 is changed into a pivoting force of the hinge 23 such that the fuel cap 21 may be entirely pivoted about the hinge 23.

The door button 28 may be mounted in a state of being accommodated in an accommodating portion 18 formed on the retainer 14, and a through-hole 18a through which the door button 28 passes may be formed on a front surface of the accommodating portion 18 of the retainer 14.

Furthermore, a button hole 27 through which the door button 28 passes may also be formed in an upper end portion of the cap cover 22. Thus, the door button 28 sequentially passes through the through-hole 18a of the retainer 14 and the button hole 27 of the cap cover 22.

Furthermore, the button cover 29a is mounted in the accommodating portion 18 of the retainer 14 to be located behind the door button 28. The button spring 29 is mounted between the button cover 29a and the door button 28 in a state of being inserted into the accommodating portion 18 of the retainer 14.

The button spring 29 is configured as a component for elastically supporting the door button 28 in the retainer 14. The button spring 29 is mounted to elastically support the door button 28 in the button cover 29a coupled to the retainer 14.

Figure 10:
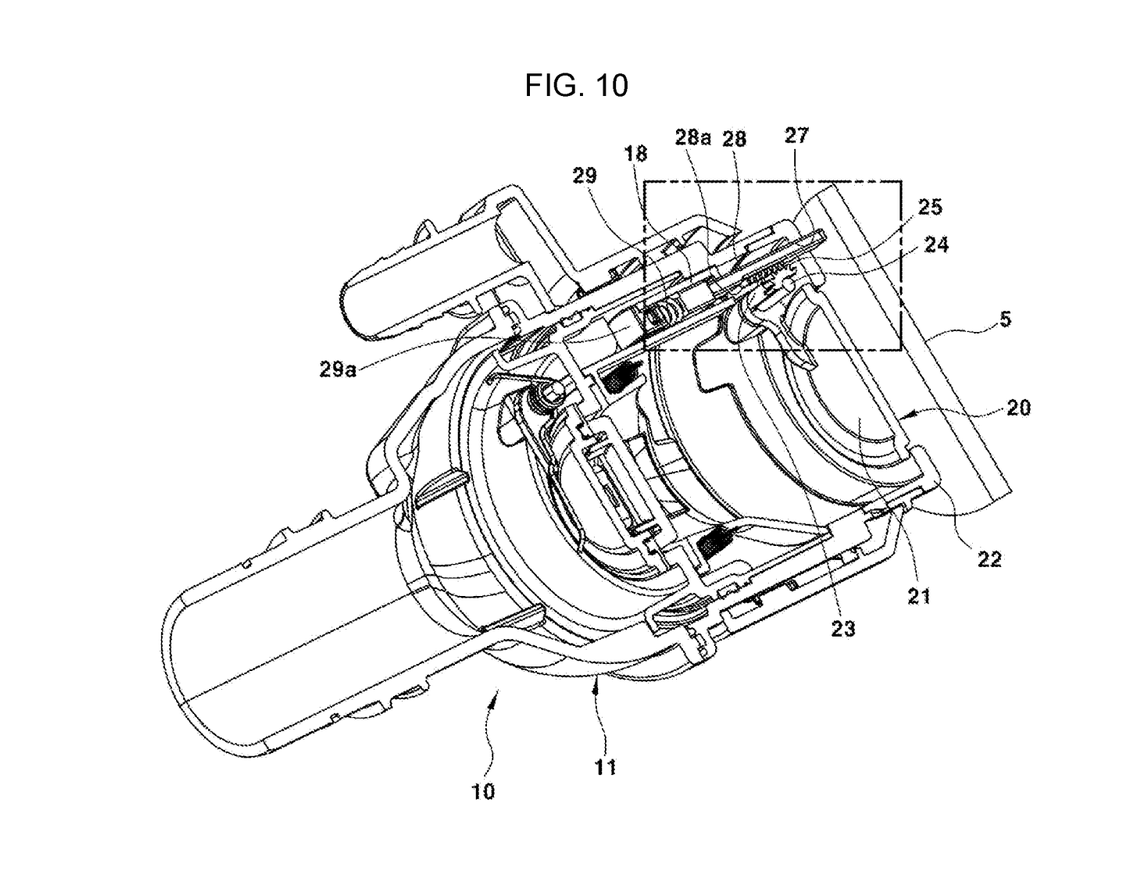
FIG. 10 is a cross-sectional view exemplarily illustrating a closed state of the automatic opening and closing device configured for a fuel inlet according to an exemplary embodiment of the present invention.

When the door button 28 is pressed by the fuel door 5 of FIG. 10 to be moved backward, the button spring 29 is compressed and deformed by the door button 28. When a force of the fuel door 5 pressing the door button 28 is released, the button spring 29 in the compressed state provides an elastic restoration force for returning the door button 28 forward thereof.

Furthermore, when the fuel door 5 is opened in a state in which the door button 28 passes through the through-hole 18a formed in the accommodating portion 18 of the retainer 14 and the button hole 27 formed in the cap cover 22, a front end portion of the door button 28 protrudes from a front surface of the cap cover 22 mounted at the fuel inlet 10.

When the fuel door 5 is closed in the above-described state, the fuel door 5 presses the protruding end portion of the door button 28, and thus the door button 28 slides backward from the accommodating portion 18 of the retainer 14 while compressing the button spring 29.

Hereinafter, an operating state of the automatic opening and closing device configured for a fuel inlet according to an exemplary embodiment of the present invention will be described with reference to the drawings.

FIG. 10 is a cross-sectional view exemplarily illustrating a closed state of the automatic opening and closing device 20 for a fuel inlet according to an exemplary embodiment of the present invention. FIG. 10 shows a state in which the front end portion of the door button 28 is pressed by the fuel door 5 in front of the cap cover 22.

Figure 11:
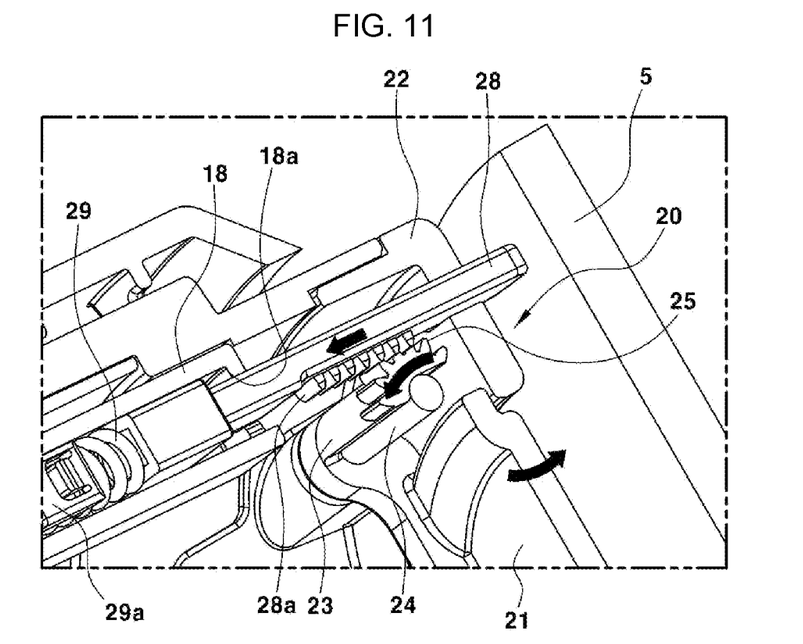
FIG. 11 is an incised perspective view exemplarily illustrating a state in which, when the automatic opening and closing device configured for a fuel inlet according to an exemplary embodiment of the present invention is in the closed state, a gear-shaped portion of a fuel cap is engaged with a rack gear of a door button.

Furthermore, FIG. 11 is an incised perspective view exemplarily illustrating a closed state of the automatic opening and closing device 20 for a fuel inlet according to the exemplary embodiment of the present invention, i.e., a state in which, when the fuel inlet 10 is in a closed state, the gear-shaped portion 25 of the fuel cap 21 is engaged with the rack gear 28a of the door button 28.

To describe the closed state of the automatic opening and closing device 20 for a fuel inlet (i.e., a closed state of the fuel inlet 10) with reference to the drawings, when the fuel door 5 is closed as usual, the door button 28 is pressed by the fuel door 5 to be in a state of being moved backward thereof.

In the instant case, the button spring 29 is maintained in the compressed state by the door button 28. Since the gear-shaped portion 25 of the fuel cap 21 is engaged with the rack gear 28a of the door button 28, when the door button 28 is moved backward as described above, the fuel cap 21 is to be in a state of closing the fuel inlet 10 as shown in FIG. 10.

While the fuel door 5 is closed, the door button 28 is continuously pressed by the fuel door 5. In the instant case, since the door button 28 is continuously maintained in the state of being moved backward, the closed state of the fuel inlet 10 by the fuel cap 21 is also continuously maintained.

Since the rack gear 28a is engaged with the gear-shaped portion 25, the closed state of the fuel inlet 10 by the fuel cap 21 may be maintained unless the door button 28 is moved forward again.

As described above, the fuel cap 21 blocks the internal path of the fuel inlet 10 such that foreign materials, dust, and the like may be prevented from flowing into the fuel inlet 10.

Figure 12:
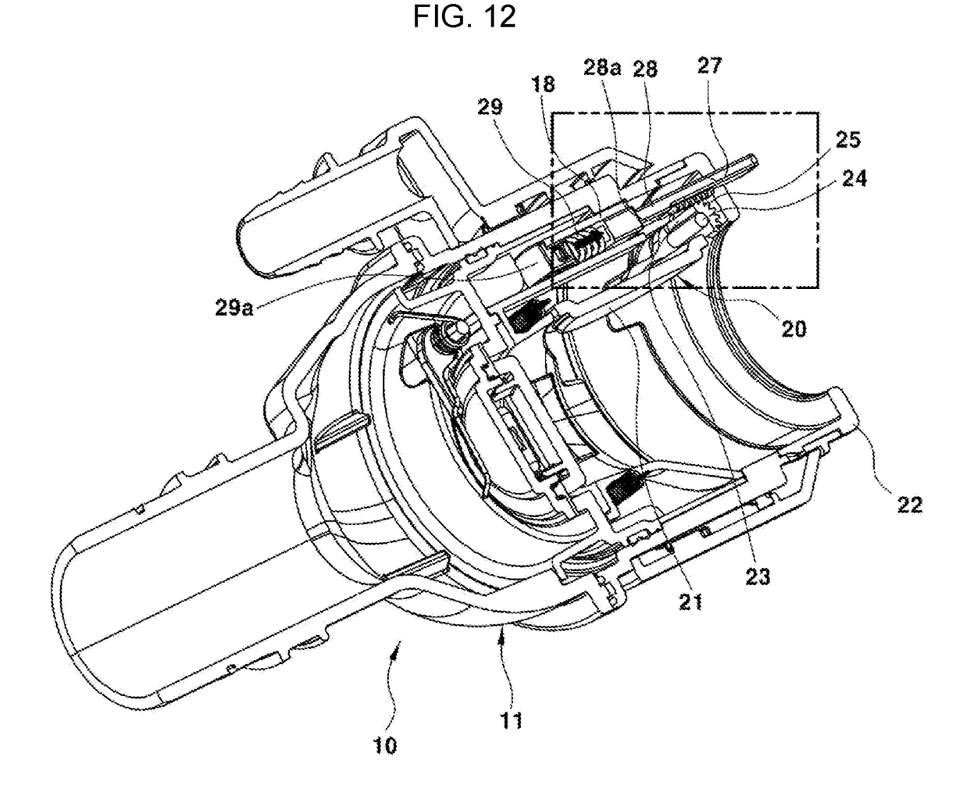
FIG. 12 is a cross-sectional view exemplarily illustrating an opened state of the automatic opening and closing device configured for a fuel inlet according to an exemplary embodiment of the present invention.

FIG. 12 is a cross-sectional view exemplarily illustrating an opened state of the automatic opening and closing device 20 for a fuel inlet according to an exemplary embodiment of the present invention. In FIG. 12, the fuel door 5 of FIG. 10 is omitted, and a state in which the front end portion of the door button 28 is not pressed by the fuel door 5 is shown.

Figure 13:
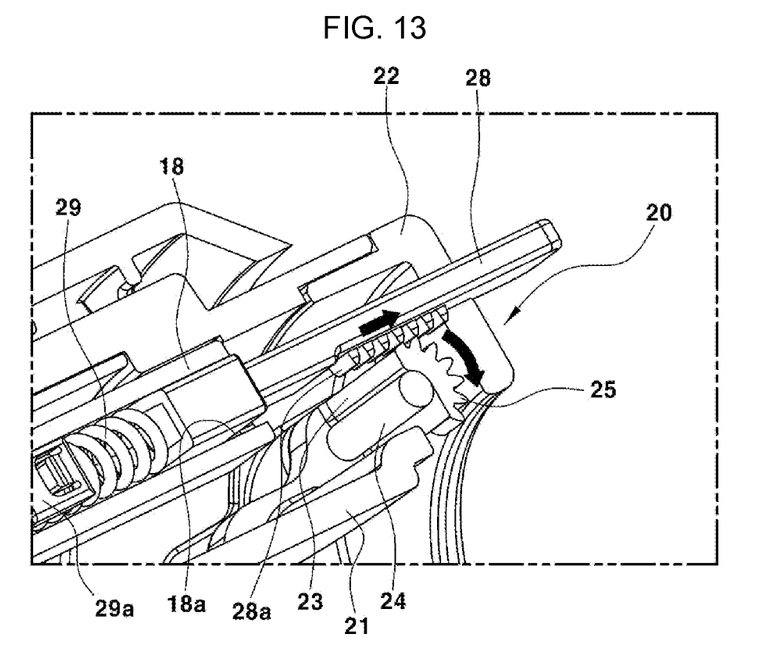
FIG. 13 is an incised perspective view exemplarily illustrating a state in which, when the automatic opening and closing device configured for a fuel inlet according to an exemplary embodiment of the present invention is in the opened state, the fuel cap is engaged with the door button.

FIG. 13 is an incised perspective view exemplarily illustrating a state in which the fuel cap 21 is engaged with the door button 28 when the automatic opening and closing device 20 for a fuel inlet according to an exemplary embodiment of the present invention is opened, i.e., an opened state of the fuel inlet 10.

When the fuel door 5 of FIG. 10 is opened to inject fuel into a vehicle, the fuel inlet 10 which is closed by the fuel cap 21 is automatically opened while the fuel cap 21 is pivoted inwardly of the fuel inlet 10.

To describe a process of opening the fuel inlet 10 in more detail, when the fuel door 5 is opened to inject fuel into the vehicle, the pressing of the door button 28 by the fuel door 5 is first released.

As described above, when the pressing of the door button 28 by the fuel door 5 is released, i.e., when the force pressing the front end portion of the door button 28 is removed, the door button 28 is moved forward in a direction of protruding from the fuel inlet 10 by the elastic restoration force of the compressed button spring 29.

The elastic restoration force of the button spring 29 acts as a force pushing the door button 28 forward thereof. Thus, the door button 28 is moved forward and thus the front end portion of the door button 28 is to be in a state of long protruding forward through the button hole 27 of the cap cover 22.

Furthermore, since the gear-shaped portion 25 of the fuel cap 21 is in a state of being engaged with the rack gear 28a of the door button 28, when the door button 28 is moved forward, the fuel cap 21 is pivoted inwardly of the fuel inlet 10 about the hinge 23 and the hinge pin 24 as the center portion of pivoting. Consequently, the fuel inlet 10 which is closed by the fuel cap 21 is to be in an opened state.

Therefore, in accordance with the automatic opening and closing device 20 according to an exemplary embodiment of the present invention, when the fuel door 5 is opened, the fuel inlet 10 is automatically opened.

As described above, when the door button 28 is moved forward and the fuel cap 21 is pivoted in an opening direction thereof, the gear-shaped portion 25 of the fuel cap 21 is engaged with the rack gear 28a of the door button 28 to generate a sound. Through the present sound, a user (a driver) may recognize that the fuel cap 21 is pivoted in the opening direction and the fuel inlet 10 is opened inside the fuel door 5.

Meanwhile, when the fuel door 5 is closed, the fuel inlet 10 is automatically closed to be in the state of FIG. 10, and FIG. 11 again.

That is, the front end portion of the door button 28 is pressed again by the fuel door 5, and the button spring 29 is compressed again while the door button 28 slides backward by the pressing force of the fuel door 5.

Furthermore, before the fuel cap 21 engaged with the door button 28 is pivoted in a direction closing the fuel inlet 10 and then the fuel door 5 is opened, i.e., the pressing by the fuel door 5 is released, the door button 28 and the fuel cap 21 are each maintained in a closed position as shown in FIG. 10, and FIG. 11.

As described above, even when the door button 28 is moved backward and the fuel cap 21 is pivoted in a closing direction thereof, the gear-shaped portion 25 of the fuel cap 21 is engaged with the rack gear 28a of the door button 28 to generate a sound. Through the present sound, the user (the driver) may recognize that the fuel cap 21 is pivoted in the closing direction and the fuel inlet 10 is closed inside the fuel door 5.

Therefore, in accordance with an automatic opening and closing device configured for a fuel inlet according to the exemplary embodiments of the present invention, when a fuel door is opened for refueling, a fuel inlet which is closed by a fuel cap is automatically opened, and when the fuel door is closed again after the refueling, the fuel inlet is automatically closed by the fuel cap.

As described above, the fuel inlet is automatically opened or closed by being interlocked with an opening and closing operation of the fuel door such that there is no demand for the user to separately operate the fuel cap for refueling and thus user convenience may be enhanced.

Furthermore, since there is no need to secure a hand operating space to be large, it is not necessary to form a large refueling space which is an internal space of the fuel door in a closed state on a side surface of a vehicle. Therefore, it is possible to reduce a refueling space and a size of the fuel door and improve appearance of the vehicle.

Furthermore, since a flap type rotary opening and closing structure in which the fuel cap is pivoted in a state of being connected to the fuel inlet to selectively open or close the fuel inlet is mounted, there is no concern for losing the fuel cap.

As described above, in accordance with an automatic opening and closing device configured for a fuel inlet of a vehicle according to an exemplary embodiment of the present invention, an automatic opening and closing operation of a fuel cap is performed by being interlocked with the opening or closing of a fuel door such that user convenience may be enhanced while refueling.

Furthermore, a hand operating space for opening or closing the fuel cap is unnecessary such that it is possible to reduce a refueling space which will be covered by the fuel door and a size of the fuel door, and thus appearance of a vehicle may be improved.

Furthermore, since the fuel cap is pivotably coupled to a fuel inlet of a filler neck assembly via a cap cover, there is no concern for losing the fuel cap while refueling.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An opening and closing device for a fuel inlet of a vehicle, the opening and closing device comprising:
   a cap cover mounted at the fuel inlet of the vehicle;
   a fuel cap pivotably mounted at the cap cover and configured to selectively open or close the fuel inlet by being pivoted inside the fuel inlet; and
   a fuel cap operating mechanism mounted in the fuel inlet and configured, when a fuel door disposed in front of the cap cover is closed, to pivot the fuel cap by being pressed by the fuel door to close the fuel inlet, and, when the fuel door is opened, to pivot the fuel cap to open the fuel inlet according to release of pressing by the fuel door, wherein the fuel cap operating mechanism includes:
a door button slidably mounted at the fuel inlet, coupled to the fuel cap to pivot the fuel cap when the door button slides, and configured to protrude from the fuel inlet to be configured to be pressed in a first direction by the fuel door in a state of sliding in a second direction which is opposite to the first direction thereof; and
a button spring mounted at the fuel inlet to elastically support the door button, and, when the pressing of the door button by the fuel door is released, configured to provide an elastic restoration force to the door button for allowing the door button to slide in the second direction.

2. The opening and closing device of claim 1,
wherein a gear portion is formed on the fuel cap;
wherein a rack gear is formed on the door button; and
wherein in a state in which the gear portion is engaged with the rack gear, a linear movement force of the door button is changed into a pivoting force of the fuel cap to pivot the fuel cap.

3. The opening and closing device of claim 2,
wherein a hinge is formed on the fuel cap and includes the gear portion;
wherein a hinge pin coupled to the hinge is coupled to an internal surface of the cap cover such that the fuel cap is pivoted about the hinge pin; and
wherein the gear portion includes teeth formed on the hinge at predetermined intervals in a circumferential direction of the hinge.

4. The opening and closing device of claim 2,
wherein the door button is formed to extend in a predetermined length and is mounted in the fuel inlet in an axial direction of the fuel inlet; and
wherein the rack gear includes teeth formed on the door button at predetermined intervals in a longitudinal direction of the door button.

5. The opening and closing device of claim 4, wherein the door button is slidably mounted at a retainer which is mounted inside the fuel inlet.

6. The opening and closing device of claim 5,
wherein an accommodating portion is formed in the retainer;
wherein the door button is slidably mounted in the accommodating portion; and
wherein the door button is provided to pass through a through-hole formed in the accommodating portion and a button hole formed in the cap cover to protrude in the second direction out of the cap cover to allow a front end portion of the door button to be selectively pressed by the fuel door.

7. The opening and closing device of claim 6,
wherein a button cover is mounted at the retainer; and
wherein the button spring is mounted between the button cover and the door button in a state of being accommodated in the accommodating portion of the retainer.

* * * * *